United States Patent
Benson et al.

(10) Patent No.: US 9,520,816 B2
(45) Date of Patent: Dec. 13, 2016

(54) ELECTRIC MOTOR SIGNATURE REDUCTION SYSTEM

(71) Applicant: The Boeing Company, Chicago, IL (US)

(72) Inventors: Christopher Pete Benson, Berkeley, CA (US); Peng Zeng, Newcastle, WA (US); Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 86 days.

(21) Appl. No.: 14/034,964

(22) Filed: Sep. 24, 2013

(65) Prior Publication Data

US 2015/0084561 A1    Mar. 26, 2015

(51) Int. Cl.
*H02K 29/06* (2006.01)
*H02P 6/04* (2016.01)

(52) U.S. Cl.
CPC ....... *H02P 6/04* (2013.01); *G05B 2219/50191* (2013.01)

(58) Field of Classification Search
USPC ....... 318/400.23, 400.17, 503, 722, 807, 51; 307/31; 123/179.14, 79.24; 320/166
See application file for complete search history.

(56) References Cited

U.S. PATENT DOCUMENTS

| | | | |
|---|---|---|---|
| 4,467,258 A | 8/1984 | Leuthen | |
| 4,965,513 A * | 10/1990 | Haynes et al. | 73/1.72 |
| 5,296,789 A | 3/1994 | Ohi | |
| 6,041,287 A * | 3/2000 | Dister et al. | 702/182 |
| 6,175,210 B1 | 1/2001 | Schwartz et al. | |
| 6,707,827 B1 | 3/2004 | Shaffer et al. | |
| 7,035,064 B2 | 4/2006 | Schimanek et al. | |
| 7,230,358 B2 | 6/2007 | Smith | |
| 7,515,447 B2 | 4/2009 | Ronkainen et al. | |
| 2005/0007096 A1* | 1/2005 | Dimino et al. | 324/142 |
| 2007/0175429 A1* | 8/2007 | Yanagida | F02N 11/04 123/179.14 |
| 2009/0276639 A1* | 11/2009 | Saha | H02M 3/156 713/300 |
| 2009/0322273 A1 | 12/2009 | Kallioniemi et al. | |
| 2010/0007300 A1* | 1/2010 | Hein | H02P 29/0088 318/503 |
| 2010/0013419 A1* | 1/2010 | White | H02P 5/74 318/51 |
| 2010/0123439 A1 | 5/2010 | Steele, Jr. et al. | |
| 2011/0076037 A1 | 3/2011 | Fukushi | |

(Continued)

OTHER PUBLICATIONS

Mohammed, "Electromagnetic Signature Modeling and Measurement of Multi-Component Ship Power Systems," Florida International University, Proposal for Funding submitted to Office of Naval Research, Aug. 2012, 17 pages.

(Continued)

*Primary Examiner* — Jorge L Carrasquillo
(74) *Attorney, Agent, or Firm* — Yee & Associates, P.C.

(57) ABSTRACT

A method and apparatus for controlling a group of electric motors. A controller is configured to identify a group of switching frequencies for a desired signature for the group of electric motors. The controller is further configured to control switching of a current supplied to the group of electric motors with the group of switching frequencies for the desired signature identified.

23 Claims, 10 Drawing Sheets

(56) References Cited

U.S. PATENT DOCUMENTS

| | | | |
|---|---|---|---|
| 2011/0080131 A1* | 4/2011 | Shimada | H02P 27/04 318/503 |
| 2011/0080762 A1* | 4/2011 | Nikolov | 363/131 |
| 2011/0193506 A1 | 8/2011 | Hayashi et al. | |
| 2012/0212167 A1* | 8/2012 | Wu | H02P 6/14 318/400.13 |
| 2013/0026955 A1* | 1/2013 | Kikunaga et al. | 318/51 |
| 2013/0057061 A1* | 3/2013 | Shiomi | B60R 16/03 307/9.1 |
| 2013/0119902 A1* | 5/2013 | Gries et al. | 318/400.3 |

OTHER PUBLICATIONS

Benson et al., "Electric Motor Frequency Modulation System," U.S. Appl. No. 13/860,720, filed Apr. 11, 2013, 49 pages.

Cameron, Jr., "Current Control in Brushless DC Motore," U.S. Appl. No. 13/303,673, filed Nov. 23, 2011, 43 pages.

"Speed Software," CD-Adapco, 4 pages, accessed Nov. 15, 2011. http://www.speedlab.co.uk/software.html.

"TG100H BLDC Inductor Board," ThinGap Corporation, 1 page, accessed Nov. 15, 2011. http://www.thingap.com/pdf/2011/tg100hbldcindboard.pdf.

Cameron, "Quadrant Change Control in Brushless DC Motors," U.S. Appl. No. 13/933,803, filed Jul. 2, 2013, 82 pages.

"Calculations," Simple Motors LLC, copyright 1999, 4 pages. Accessed Mar. 18, 2015, http://simplemotor.com/calculations/.

Office Action, dated Mar. 24, 2015, regarding U.S. Appl. No. 13/860,720, 17 pages.

Office Action, dated Aug. 28, 2015, regarding U.S. Appl. No. 13/860,720, 17 pages.

Final Office Action, dated May 18, 2015, regarding U.S. Appl. No. 13/860,720, 10 pages.

Notice of Allowance, dated Dec. 15, 2015, regarding U.S. Appl. No. 13/860,720, 11 pages.

* cited by examiner

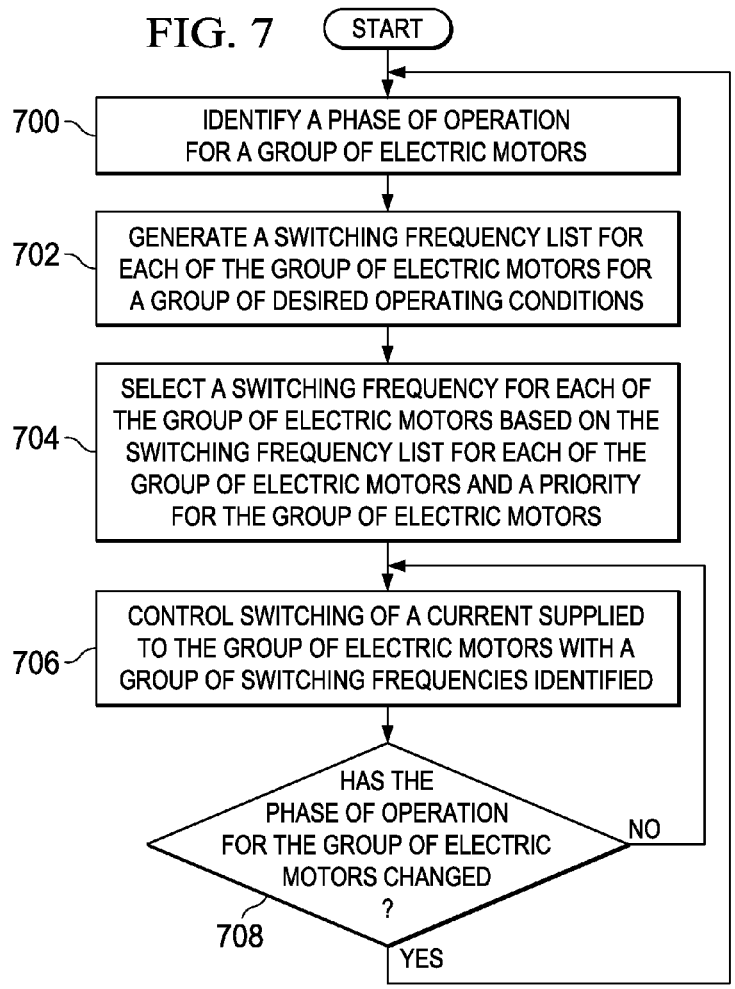
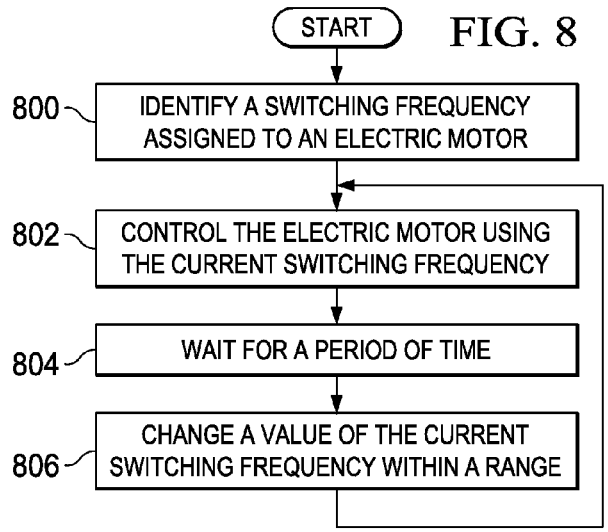

FIG. 10

| OPERATING PARAMETERS | CONSTRAINT | ACTION |
|---|---|---|
| MAXIMUM STATOR TEMPERATURE | MAXIMUM STATOR TEMPERATURE HAS BEEN EXCEEDED | SET THE SWITCHING FREQUENCY TO ABOUT 40 kHz |
| MAXIMUM STATOR TEMPERATURE INCREASE RATE | MAXIMUM STATOR TEMPERATURE INCREASE RATE HAS BEEN EXCEEDED AND MAXIMUM STATOR TEMPERATURE IS AT LEAST 90% | SET THE SWITCHING FREQUENCY TO ABOUT 40 kHz |
| MAXIMUM CONTROLLER TEMPERATURE | MAXIMUM CONTROLLER TEMPERATURE HAS BEEN EXCEEDED | SET THE SWITCHING FREQUENCY TO ABOUT 20 kHz |
| MAXIMUM CONTROLLER TEMPERATURE INCREASE RATE | MAXIMUM CONTROLLER TEMPERATURE INCREASE RATE HAS BEEN EXCEEDED AND MAXIMUM CONTROLLER TEMPERATURE IS AT LEAST 90% | SET THE SWITCHING FREQUENCY TO ABOUT 20 kHz |

FIG. 11

| OPERATING PARAMETERS | CONSTRAINT | ACTION |
|---|---|---|
| REVOLUTIONS PER MINUTE (RPM) | RPM INCREASES/DECREASES BY 10% SINCE LAST SWEEP | FREQUENCY SWEEP |
| TORQUE | TORQUE INCREASES/DECREASES BY 10% SINCE LAST SWEEP | FREQUENCY SWEEP |

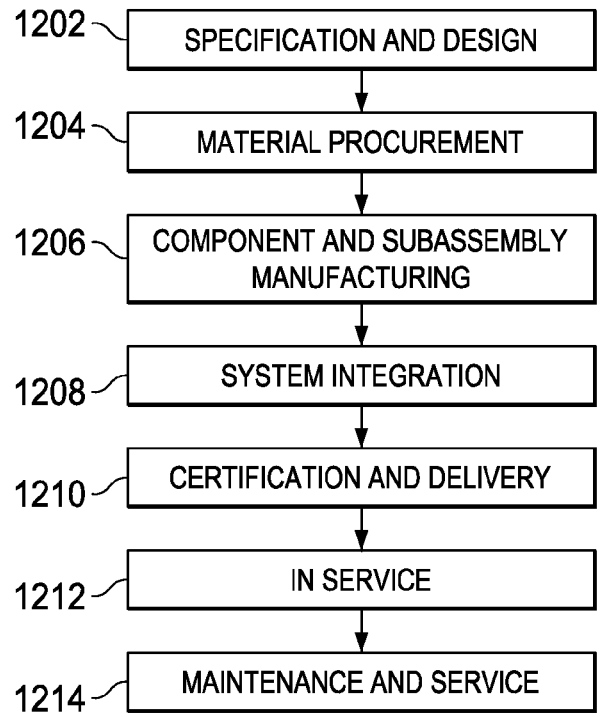
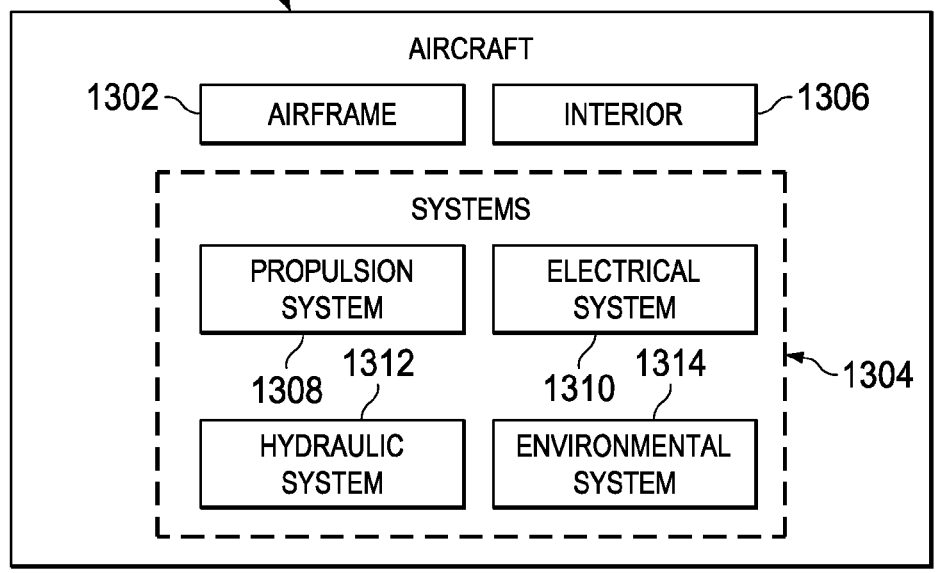

ELECTRIC MOTOR SIGNATURE REDUCTION SYSTEM

CROSS-REFERENCE TO RELATED APPLICATION

This application is related to U.S. patent application Ser. No. 13/860,720, filed Apr. 11, 2013, and entitled "Electric Motor Frequency Modulation System," which is incorporated herein by reference in its entirety.

BACKGROUND INFORMATION

1. Field

The present disclosure relates generally to electric motor systems and, in particular, to controlling electric motor systems. Still more particularly, the present disclosure relates to a method and apparatus for controlling the emitted signature of an electric motor system.

2. Background

An electric motor is a device that converts electrical power into mechanical power. Electric motors are used for various applications. These applications include fans, pumps, tools, disk drives, drills, and other types of devices that may be found in these and other types of platforms.

A brushless electric motor is a commonly used type of electric motor. With brushless electric motors, a controller is configured to change the current in windings in the electric motor. In particular, the current is switched at a frequency that changes the amplitude of the current applied to the windings in phases in a manner that causes the motor to turn. The switching of the current is performed using switches in the form of transistors. These transistors may be located on an inverter board in the electric motor system.

Often, multiple brushless electric motors are used in an electric motor system. The operation of brushless electric motors in the electric motor system may result in a signature generated by the electric motor system. Each of the brushless electric motors may generate an individual signature that forms the overall signature of the electric motor system. This signature may include electromagnetic, acoustic, and thermal signatures.

For example, the switching of the current for brushless electric motors by transistors in an inverter board in the electric motor system may generate electromagnetic signals, acoustic signals, or both. In some cases, the switching frequency may be in the range of human hearing. The frequencies of the acoustic signals generated by the operation of brushless electric motors may coincide in a manner that results in an acoustic signature that may disturb persons near the brushless electric motors. In other words, the noise generated by the brushless electric motors may be greater than desired.

As another example, switching of the current for brushless electric motors may generate electromagnetic signals. These electromagnetic signals generated by the different brushless electric motors may coincide in a manner that results in a large spike in the magnitude of the electromagnetic signals. As a result, the electromagnetic signature of an electric motor system may be greater than desired.

Currently, one manner in which the acoustic signature of an electric motor system may be reduced is through the use of soundproof insulation in a housing that encloses the brushless electric motors, inverter board, or both. With respect to the electromagnetic signature, the components may be enclosed in a Faraday cage.

These types of solutions, however, may increase the weight, bulk, cost, or a combination of these factors for the electric motor system. When these types of factors are important, such as in an aircraft, the currently available solutions may be less than desirable.

Therefore, it would be desirable to have a method and apparatus that take into account at least one of the issues discussed above as well as possibly other issues.

SUMMARY

In one illustrative embodiment, an apparatus comprises a controller. The controller is configured to identify a group of switching frequencies for a desired signature for a group of electric motors. The controller is further configured to control switching of a current supplied to the group of electric motors with the group of switching frequencies for the desired signature identified.

In another illustrative embodiment, an electric motor system comprises a group of electric motors and a controller. The controller is configured to identify a group of switching frequencies for a desired signature for the group of electric motors. The controller is further configured to control switching of a current supplied to the group of electric motors with the group of switching frequencies identified.

In still another illustrative embodiment, a method for controlling a group of electric motors is provided. A group of switching frequencies for a desired signature is identified for the group of electric motors. Switching of a current supplied to the group of electric motors with the group of switching frequencies identified is controlled.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a flowchart of a process for controlling an electric motor in accordance with an illustrative embodiment;

FIG. 8 is an illustration of a flowchart of a process for managing switching frequencies for electric motors in accordance with an illustrative embodiment;

FIG. 10 is an illustration of a table of rules for handling operating parameters in accordance with an illustrative embodiment;

FIG. 11 is an illustration of a table of events that may be used to restart the identification of a switching frequency in accordance with an illustrative embodiment;

FIG. 12 is an illustration of a block diagram of an aircraft manufacturing and service method in accordance with an illustrative embodiment;

FIG. 13 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that many electric motor systems with multiple motors are largely non-integrated and typically operate as if each motor was independent of the other motors. With this type of consumption, undesired signatures may occur with respect to electric motor systems.

The illustrative embodiments recognize and take into account that another manner in which the signature of an electric motor system may be controlled is by controlling the frequencies at which the switching of currents is performed; this may be done by taking into account the different electric motors present in the electric motor system. In other words, a cooperative switching frequency selection system may be used. In the cooperative switching frequency selection system, all of the electric motors in the electric motor system are taken into account in controlling the signature of the electric motor system. In particular, the frequency at which currents are switched for one or more electric motors may be modified.

The illustrative embodiments also recognize and take into account that the controlling of the frequency at which currents are switched for one or more electric motors in an electric motor system may be performed dynamically. In other words, the switching frequency may be controlled during the operation of the electric motors. These frequencies may be controlled in a manner that reduces the signature of an electric motor system containing one or more motors.

Thus, the illustrative embodiments provide a method and apparatus for controlling the signature of an electric motor system. In one illustrative example, an apparatus comprises a controller configured to identify a group of switching frequencies for a desired signature for a group of electric motors and control switching of a current supplied to the group of electric motors with the group of switching frequencies for the desired signature identified.

Figure 1:
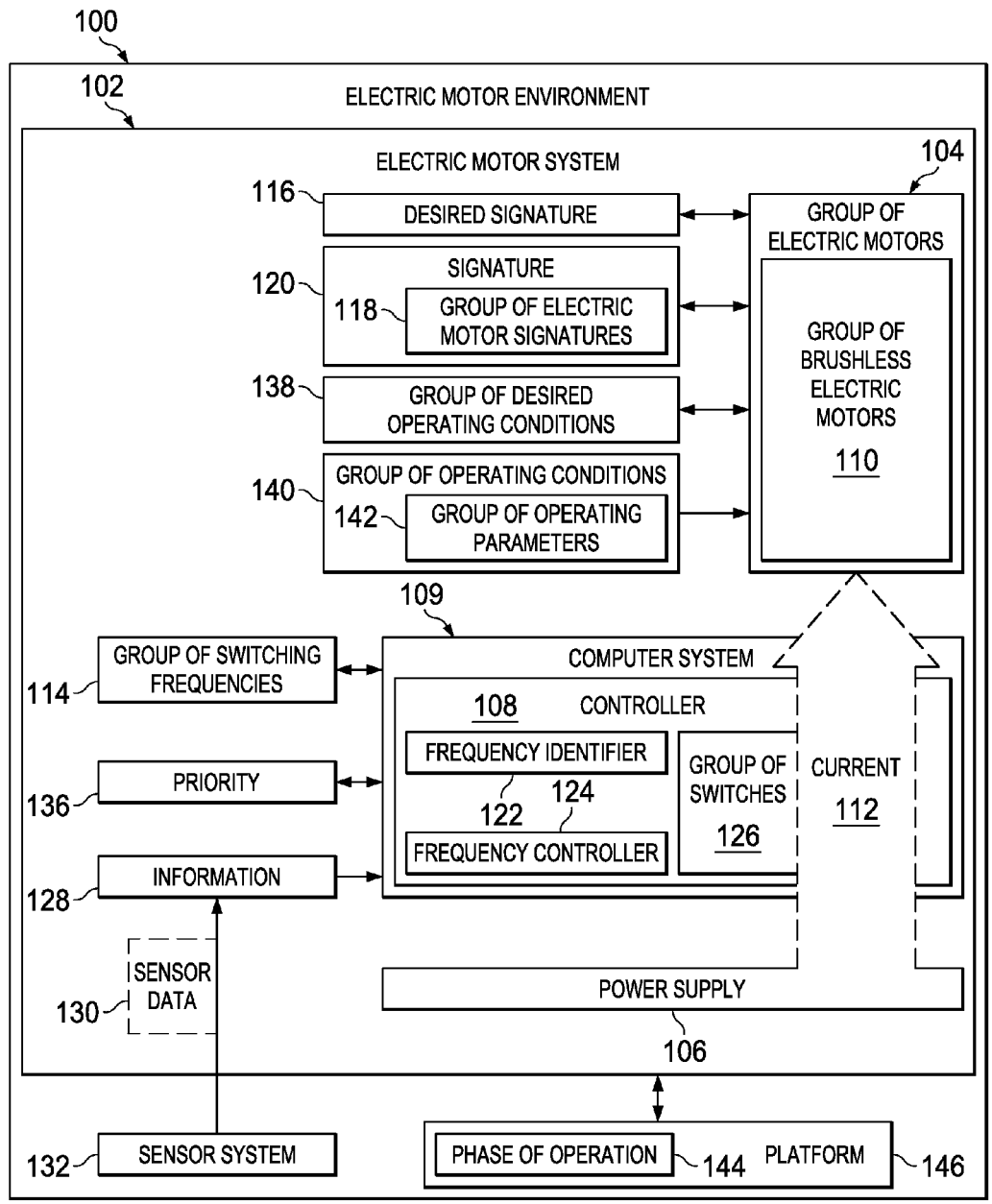
FIG. 1 is an illustration of a block diagram of an electric motor environment in accordance with an illustrative embodiment.

With reference now to the figures, and in particular, with reference to FIG. 1, an illustration of a block diagram of an electric motor environment is depicted in accordance with an illustrative embodiment. Electric motor environment 100 is an example of an environment in which an illustrative embodiment may be implemented.

Electric motor system 102 in electric motor environment 100 includes a number of different components. As depicted, electric motor system 102 includes group of electric motors 104, power supply 106, and controller 108.

Group of electric motors 104 is configured to generate rotary or linear torque or force. In these illustrative examples, group of electric motors 104 takes the form of group of brushless electric motors 110.

A "group of," as used herein with reference to items, means one or more items. For example, group of electric motors 104 is one or more electric motors.

Power supply 106 supplies current 112 to group of electric motors 104 through controller 108. Power supply 106 may take various forms. For example, power supply 106 may be selected from at least one of a battery, a power supply unit that converts alternating current to direct current, an electric generator, or some other suitable component.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or category. In other words, at least one of means any combination of items and number of items may be used from the list but not all of the items in the list are required.

Controller 108 is a hardware device in these illustrative examples. Controller 108 may include software. The hardware may include circuits that operate to perform the operations in controller 108.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 108 may be implemented in computer system 109. Computer system 109 may include one or more computers. When more than one computer is present in computer system 109, these computers may be in communication with each other over a communications medium such as a network.

In this illustrative example, controller 108 is configured to identify group of switching frequencies 114 meeting desired signature 116 for group of electric motors 104. Further, controller 108 is configured to control switching of current 112 supplied to group of electric motors 104 with group of switching frequencies 114 for desired signature 116 identified by controller 108.

In the illustrative examples, current 112 supplied to each electric motor in group of electric motors 104 may have a different switching frequency in group of switching frequencies 114. As depicted, the particular frequencies used for each electric motor in group of electric motors 104 results in group of electric motor signatures 118 that form signature 120 for electric motor system 102.

Signature 120 may take various forms. For example, signature 120 may be comprised of at least one of electromagnetic signals, acoustic signals, or other types of signals that may be generated by the operation of group of electric motors 104. For example, signature 120 may be generated by at least one of electromagnetic signals, acoustic signals, or other types of signals. These signals may be generated by operation of at least one of group of switches 126 in controller 108, group of electric motors 104, or other components in electric motor system 102.

In this illustrative example, controller 108 may be comprised of a number of different components. For example, controller 108 may include frequency identifier 122, frequency controller 124, and group of switches 126.

As depicted, frequency identifier 122 may be implemented as hardware, software, or a combination thereof. As depicted, frequency identifier 122 may receive desired signature 116 in information 128 for operating group of electric motors 104 in electric motor system 102. Frequency identifier 122 may then identify group of switching frequencies 114 for group of electric motors 104 that results in signature 120 being close to desired signature 116. In some examples, group of switching frequencies 114 may be selected such that signature 120 is substantially the same as desired signature 116.

Further, frequency identifier 122 may receive information 128 about signature 120 in selecting group of switching frequencies 114. For example, sensor system 132 may generate sensor data 130 about signature 120 in information 128. Sensor data 130 may be used to change group of switching frequencies 114 during operation of group of electric motors 104.

In the illustrative examples, frequency controller 124 may be implemented as hardware, software, or a combination thereof. Frequency controller 124 is configured to control switching of current 112 supplied to group of electric motors 104 with group of switching frequencies 114 identified.

As depicted, group of switches 126 switch between on and off positions to control the flow of current 112 from power supply 106 to group of electric motors 104 at group of switching frequencies 114. In particular, group of switches 126, controlled by controller 108, may be configured to operate at a specified switching frequency identified by frequency controller 124 in controller 108. Each electric motor in group of electric motors 104 may have a different switching frequency specified by frequency controller 124 in these illustrative examples.

Further, other factors in addition to or in place of desired signature 116 may be taken into account in selecting group of switching frequencies 114. For example, frequency identifier 122 in controller 108 may be configured to select group of switching frequencies 114 based on priority 136 between group of desired operating conditions 138 for group of electric motors 104 and desired signature 116 for group of electric motors 104. In this illustrative example, priority 136 may result in signature 120 not reaching desired signature 116 in some cases, a change in desired signature 116, or both.

Priority 136 may be set in a number of different ways. For example, priority 136 may be set based on a policy. The policy is one or more rules and may be based on factors such as performance, detectability, a particular phase of operation, or other suitable factors. Performance may be for one or more of group of electric motors 104 when more than one electric motor is present. The detectability may be based on an electromagnetic signature, an acoustic signature, or some other suitable type of detectability. The phase of operation may be a particular time or type of operation for group of electric motors 104.

In the illustrative examples, group of desired operating conditions 138 is one or more desired operating conditions. In the illustrative examples, group of desired operating conditions 138 may be selected from at least one of efficiency, power, or other desirable operating conditions. In these illustrative examples, the efficiency may be the efficiency of electric motor system 102. This efficiency may be based on reducing heat generated by at least one of group of electric motors 104 or controller 108. The power may be power or torque generated by electric motor system 102.

Thus, group of switching frequencies 114 may be identified from information 128 relating to the operation of an electric motor in group of electric motors 104. As depicted, information 128 may include group of operating conditions 140. In this illustrative example, group of operating conditions 140 is one or more conditions that are detected or sensed in electric motor environment 100 as opposed to desired conditions in group of desired operating conditions 138.

Group of operating conditions 140 may take various forms. For example, group of operating conditions 140 may include at least one of a motor load, a rate of change of temperature for group of switches 126, a temperature of the motor, a temperature of a stator in the motor, or other suitable operating conditions relating to the operation of group of electric motors 104. Examples of other operating conditions in group of operating conditions 140 may be humidity, airflow rate, coolant flow rate, or other suitable conditions.

Frequency identifier 122 may select group of switching frequencies 114 using group of operating conditions 140 in view of group of desired operating conditions 138 and signature 120 in view of desired signature 116.

Priority 136 between desired signature 116 and group of desired operating conditions 138 may be used to select group of switching frequencies 114. In some cases, desired signature 116 may have a lower priority than one or more of group of desired operating conditions 138. In other cases, desired signature 116 may have a higher priority than one or more of group of desired operating conditions 138. As a result, controller 108 may be configured to identify group of switching frequencies 114 based on desired signature 116 and group of desired operating conditions 138 in addition to just being based on desired signature 116.

In the illustrative examples, controller 108 is configured to change group of switching frequencies 114 during operation of group of electric motors 104. Further, group of switching frequencies 114 may change in response to changes in at least one of group of operating parameters 142 for group of electric motors 104 or phase of operation 144 of platform 146 in which group of electric motors 104 is located.

As depicted, group of operating parameters 142 is one or more operating parameters for group of desired operating conditions 138. Group of operating parameters 142 may include, for example, at least one of a maximum temperature for the electric motor, a desired temperature for group of switches 126, heat flux across components in controller 108, or other suitable parameters.

Phase of operation 144 for platform 146 may vary depending on the form that platform 146 takes. For example, platform 146 may be selected from one of a mobile platform, a stationary platform, a land-based structure, an aquatic-based structure, and a space-based structure. More specifically, the platform may be selected from one of an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms. When platform 146 takes the form of an aircraft, phase of operation 144 may be selected from one of taxiing, take off, ascent, cruising, descent, landing, or some other suitable phase of operation for the aircraft.

In the illustrative examples, controller 108 may take the form of a commutation controller. In particular, controller 108 may be an impulse width modulation controller (IWMC) that modulates group of switching frequencies 114 used to drive switches in group of switches 126 in the form of transistors that control current 112 sent to group of electric motors 104. Current 112 may be used to control the voltage across group of electric motors 104.

In the illustrative examples, group of switching frequencies 114 is not the same frequencies as those used to control the speed of group of electric motors 104. Group of switching frequencies 114 is higher than the frequencies used to control speeds of group of electric motors 104.

For example, a switching frequency in group of switching frequencies 114 may be about 20 kHz in one non-limiting example. In this example, about 1,200,000 switchings occur each minute. On the other hand, the revolutions per minute of an electric motor in group of electric motors 104 may be, for example, 7000 rpm. As can be seen, the switching frequency is typically higher than the rotations of the electric motor.

As a result, the rotation speed of an electric motor in group of electric motors 104 may not be affected by switching frequency due to the difference between switching frequency and the rotation of the electric motor. In this example, the switching frequency may be selected such that the switching frequency does not affect the rotation of the electric motor. Instead, the switching frequency may be selected to control electric current in windings within the electric motor. The switching of current may be used to control the amplitude of the current through different windings within the electric motor causing the electric motor to rotate.

Thus, in the illustrative examples, electric motor system 102 may function as an electric motor signature reduction system. As depicted, desired signature 116 may be reached using controller 108 for electric motor system 102 to control the operation of group of electric motors 104. In particular, group of switching frequencies 114 may be selected to reduce signature 120 to reach or substantially reach desired signature 116.

As depicted, electric motor system 102 does not need soundproof insulation, a Faraday cage, or other components that may increase at least one of the weight, size, or expense for electric motor system 102. In the illustrative examples, expense may be reduced without requiring additional components. Controller 108 may be configured to perform the selection of group of switching frequencies 114 as described above. Additional controllers and other components may be unnecessary in these illustrative examples.

The illustration of electric motor environment 100 and the different components in electric motor environment 100 in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 132 may be part of electric motor system 102 instead of a separate component as illustrated. In another illustrative example, controller 108, although shown in a separate block from group of electric motors 104, may be integrated as part of group of electric motors 104.

As another example, although controller 108 is described as being implemented using an impulse width modulation controller (IWMC) in the illustrative examples, controller 108 may be implemented in other ways. For example, controller 108 may also be implemented using pulse width modulation (PWM) controllers.

Figure 2:
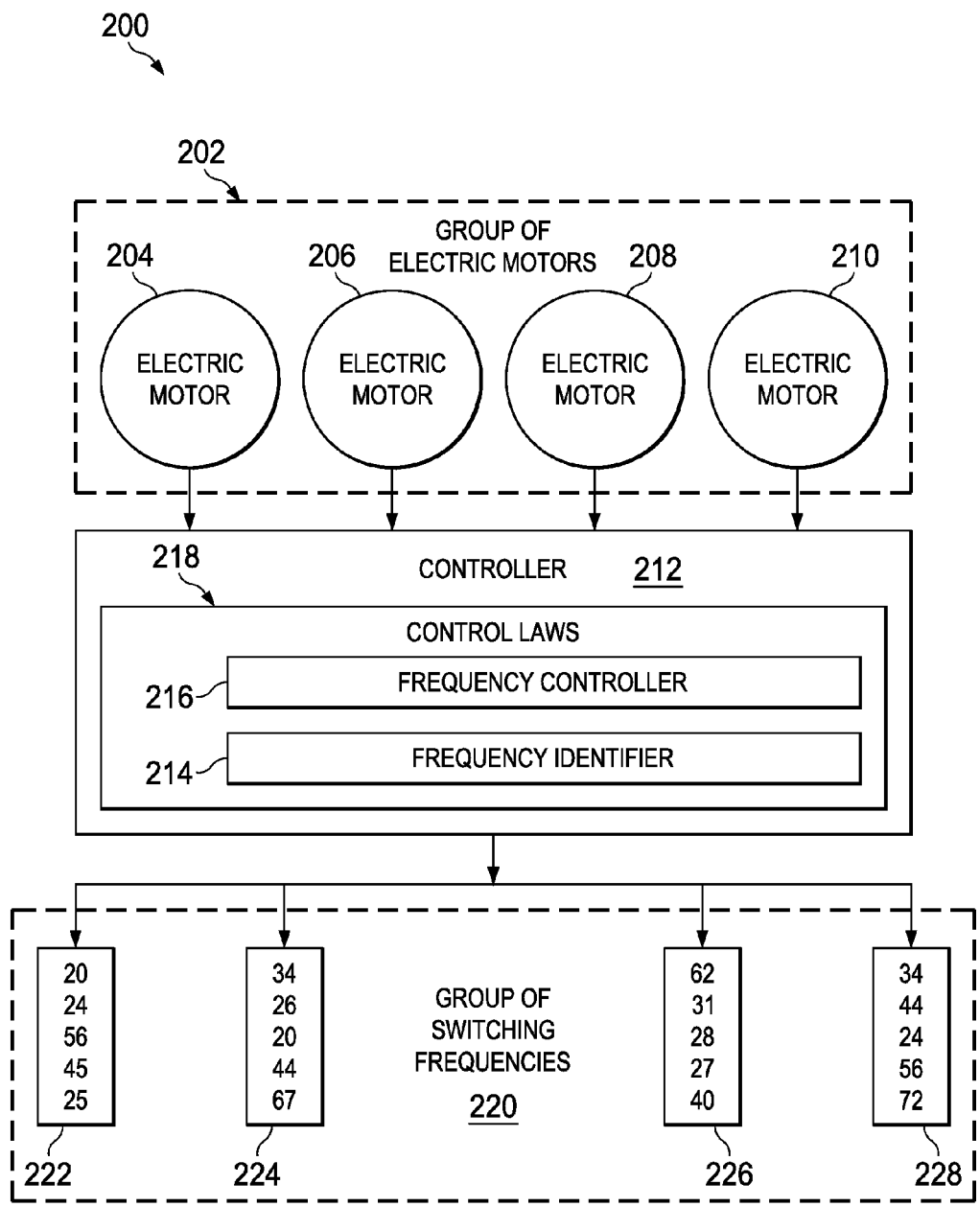
FIG. 2 is an illustration of an electric motor system in accordance with an illustrative embodiment.

With reference next to FIG. 2, an illustration of an electric motor system is depicted in accordance with an illustrative embodiment. In this illustrative example, electric motor system 200 is an example of an implementation for electric motor system 102 in FIG. 1. Further, electric motor system 102 may be implemented as an example of a cooperative switching frequency selection system.

As depicted in FIG. 2, electric motor system 200 includes group of electric motors 202. In particular, group of electric motors 202 comprises electric motor 204, electric motor 206, electric motor 208, and electric motor 210. As depicted, each of the electric motors in group of electric motors 202 has a priority. In one example, electric motor 204 has the highest priority, electric motor 206 has the next highest priority, electric motor 208 has the third highest priority, and electric motor 210 has the lowest priority in the group.

In this illustrative example, controller 212 is configured to control the operation of group of electric motors 202. Controller 212 is an example of an implementation for controller 108 in FIG. 1. In the illustrative examples, the control of the operation of group of electric motors 202 may be performed using frequency identifier 214 and frequency controller 216. These two components are implemented in control laws 218 in controller 212. These control laws may be implemented in software, hardware, or some combination thereof.

Frequency identifier 214 is configured to identify group of switching frequencies 220 for group of electric motors 202. Group of switching frequencies 220 is comprised of lists of switching frequencies. As depicted, switching frequency list 222, switching frequency list 224, switching frequency list 226, and switching frequency list 228 are present in group of switching frequencies 220 and displayed as an ordered list of switching frequencies for particular electric motors in group of electric motors 202. These lists of switching frequencies are an example of an implementation for group of switching frequencies 114 in FIG. 1.

As depicted, switching frequency list 222 is identified for electric motor 204, switching frequency list 224 is identified for electric motor 206, switching frequency list 226 is identified for electric motor 208, and switching frequency list 228 is identified for electric motor 210.

In this illustrative example, the different switching frequencies in each list are identified as ones usable to meet a desired signature for the operation of electric motor system 200. In this particular example, all of group of switching frequencies 220 may be used to meet a desired signature.

Additionally, the switching frequencies for different electric motors in group of electric motors 202 are listed in order of preference with respect to performance of group of electric motors 202 in the different switching frequency lists in the group of switching frequencies 220. The switching frequencies at the top of each switching frequency list are the most preferred switching frequencies for the respective electric motor in the illustrative example. Lower switching frequencies in a switching frequency list provide a lower level performance in this particular example.

In these illustrative examples, some of the switching frequencies for a particular electric motor may be the same as switching frequencies for another electric motor. For example, switching frequency list 224 for electric motor 206 and switching frequency list 228 for electric motor 210 have an overlap with respect to the first two switching frequencies in the two lists. For example, the switching frequencies 34 kHz and 44 kHz are provided in both lists.

In the illustrative example, frequency identifier 214 is configured to select a particular switching frequency used for each electric motor. As depicted, assigning the same switching frequency to more than one electric motor may be undesirable. When more than one electric motor in group of electric motors 202 has the same switching frequency, the magnitude of the signature for group of electric motors 202 is greater at that particular frequency. As a result, the detectability of electric motor system 200 during the operation of group of electric motors 202 may increase undesirably. Of course, in other illustrative examples, assigning the same frequencies to more than one electric motor may be acceptable depending on the particular implementation.

For reducing detectability, if the same switching frequency is present, a priority may be used to determine which electric motor may be assigned a particular switching frequency. The electric motor with the higher priority would use the desired switching frequency, while the electric motor with the lower priority would use the next switching frequency in the list.

For example, the best switching frequency with respect to performance for electric motor 206 in switching frequency list 224 and electric motor 210 in switching frequency list 228 is 34 kHz. In this illustrative example, it may be undesirable to assign both electric motors the same switching frequency to reduce the detectability of the operation of group of electric motors 202 in electric motor system 200. As depicted, electric motor 206 has a higher priority than electric motor 210.

As a result, electric motor 206 is assigned the switching frequency of 34 kHz, while electric motor 210 is assigned the switching frequency of 44 kHz. With this assignment, the performance of electric motor 210 may be lower with the use of the switching frequency of 44 kHz rather than the switching frequency of 34 kHz. The selection, however, is made to reduce the detectability of electric motor system 200.

In the illustrative example, switching frequencies for operating electric motor system 200 may be identified periodically. The identification of the frequencies may be performed during operation of electric motor system 200 repeatedly to take into account changes that may affect at least one of the performance of group of electric motors 202, the signature of group of electric motors 202, or some combination thereof. The repeated identification of the switching frequencies may be performed to obtain a desired performance for electric motor system 200 with respect to at least one of performance for detectability of the operation of electric motor system 200.

For example, during different phases of flight, the detectability of one or more of group of electric motors 202 may come secondary to the performance of group of electric motors 202. As one example, performance of electric motor 206 and electric motor 210 may be more important than the detectability of a signature. Accordingly, controller 212 may allow both electric motor 206 and electric motor 210 to operate at 34 kHz to provide a desired level of performance.

For instance, during takeoff of an aircraft, optimal power performance may be desirable such that control laws 218 allow more than one electric motor to operate at the same frequency. As power performance decreases in priority, such as during cruising of the aircraft, controller 212 may dynamically change operating frequencies such that electric motor 206 and electric motor 210 operate at 34 kHz and 44 kHz, respectively, as described above.

In some illustrative examples, each electric motor in group of electric motors 202 may have its own motor controller 212 and motor inverter. In other examples, each motor controller may determine a set of optimal switching frequencies and send this set to frequency controller 216. In other words, not only may each motor have its own motor controller and power inverter, but each motor may also have a frequency identifier to determine a set of optimal switching frequencies. These parallel systems may then send their sets of switching frequencies to frequency controller 216 for frequency management and signature control.

Figure 3:
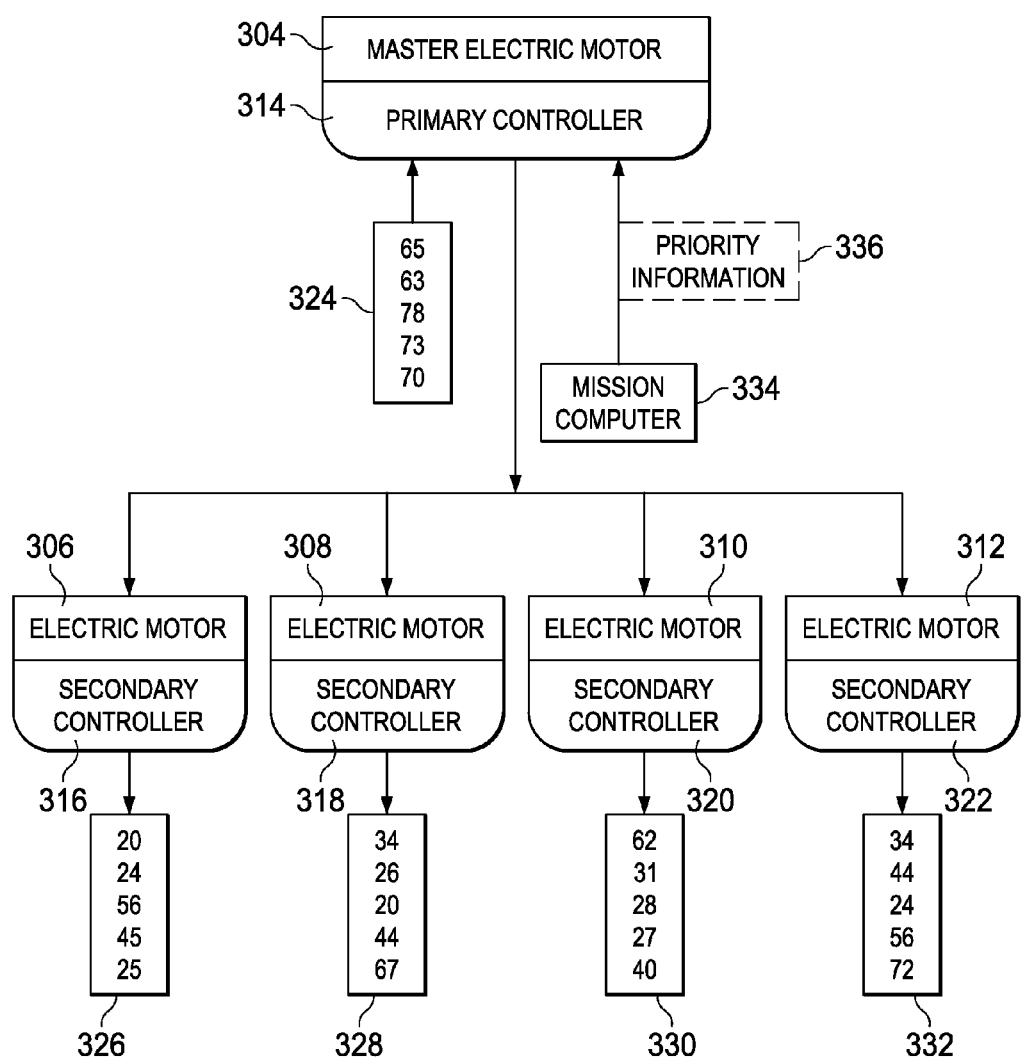
FIG. 3 is another illustration of an electric motor system in accordance with an illustrative embodiment.

With reference next to FIG. 3, another illustration of an electric motor system is depicted in accordance with an illustrative embodiment. In this illustrative example, electric motor system 300 is another illustrative example of an implementation for electric motor system 102 in FIG. 1.

In this particular example, the group of electric motors comprises master electric motor 304, electric motor 306, electric motor 308, electric motor 310, and electric motor 312. These electric motors are another example of an implementation for group of electric motors 104 in FIG. 1.

With this illustrative example, master electric motor 304 may turn a drive shaft for a propeller in an electric engine for an aircraft. Electric motor 306, electric motor 308, electric motor 310, and electric motor 312 may perform other operations such as moving control surfaces, rotating exhaust fans, and other suitable operations in the aircraft.

In this illustrative example, the controller for electric motor system 300 is distributed among the different electric motors. For example, the controller includes primary controller 314, secondary controller 316, secondary controller 318, secondary controller 320, and secondary controller 322. Primary controller 314 is associated with master electric motor 304, secondary controller 316 is associated with electric motor 306, secondary controller 318 is associated with electric motor 308, secondary controller 320 is associated with electric motor 310, and secondary controller 322 is associated with electric motor 312.

These different controllers are another example of an implementation for controller 108 in FIG. 1. In other words, although controller 108 is shown as a single block, some implementations may distribute the function of controller 108 to different locations or components.

As depicted, these controllers generate a group of switching frequencies for operating the group of electric motors. In particular, these controllers generate lists of switching frequencies.

For example, primary controller 314 generates switching frequency list 324. In this illustrative example, secondary controller 316 generates switching frequency list 326, secondary controller 318 generates switching frequency list 328, secondary controller 320 generates switching frequency list 330, and secondary controller 322 generates switching frequency list 332. In this particular example, the switching frequencies of these lists are ordered in a preference for performance for the different electric motors for which they are generated.

In this illustrative example, each of the secondary controllers sends a request for a desired switching frequency for an electric motor to primary controller 314. Primary controller 314 is configured to determine whether the requested switching frequency may be used by a particular electric motor.

In other words, primary controller 314 controls which switching frequencies are used by different electric motors in electric motor system 300. For example, secondary controller 318 requests a switching frequency of 34 kHz. Additionally, secondary controller 322 also requests a switching frequency of 34 kHz. The switching frequency of 34 kHz is the first frequency listed and most desirable frequency for performance of electric motor 308 and electric motor 312.

In this depicted example, the performance determination may be based on a group of desired operating conditions for the electric motor. For instance, each electric motor may have a list of frequencies that has historically been used to meet demand and operability requirements of that particular motor. As an example, the more desirable operating frequencies for master electric motor 304 may be different than the electric motors that perform different functions.

In this example, having two electric motors using the same switching frequency is undesirable. As a result, primary controller 314 may decide which electric motor uses the switching frequency of 34 kHz. This decision is made using a priority scheme in the illustrative example.

In this illustrative example, master electric motor 304 has the highest priority. Thereafter, the priority for the remaining electric motors is as follows in descending order of priority: electric motor 306, electric motor 308, electric motor 310, and electric motor 312. Thus, as depicted in this illustrative example, electric motor 306 has a higher priority than electric motor 308. As a result, master electric motor 304 sends a reply to secondary controller 318 that allows electric motor 308 to use the switching frequency of 34 kHz.

In this example, secondary controller 322 may then request use of the second switching frequency in switching frequency list 332. The second switching frequency of 44 kHz is still a desirable switching frequency, but not the most desirable. Primary controller 314 returns a reply to secondary controller 322 that the switching frequency of 44 kHz may be used for operating electric motor 312. In turn, secondary controller 322 controls the operation of electric motor 312 using this switching frequency.

Further, the priorities may change depending on the phase of operation for the aircraft in this particular example. As depicted, mission computer 334 may send priority information 336 to primary controller 314. Priority information 336 may take various forms. For example, priority information 336 may identify a phase of operation of an aircraft. In other illustrative examples, priority information 336 may be assignments of priorities for the different electric motors.

In the illustrative example, priority information 336 may be sent as the phase of operation of the aircraft changes. In this example, the phase of operation may be selected from one of taxiing, take off, ascent, cruising, descent, landing, or some other suitable phase of operation for the aircraft. As a result of receiving priority information 336, primary controller 314 may reconfigure one or more of the electric motors and the switching frequencies of those electric motors.

In some examples, two electric motors may request switching frequencies that are integer multiples of one another. For example, electric motor 306 may request a switching frequency of 20 kHz, while electric motor 310 may request a switching frequency of 40 kHz.

In this depicted example, two electric motors operating on integer multiple frequencies may be undesirable. For example, it may be desirable to avoid harmonics, potential constructive interference, and amplitude spikes. Accordingly, primary controller 314 may not allow one or more of electric motor 306 and electric motor 310 to operate at the requested frequencies in this instance, depending on whether detectability of an acoustic signature is prioritized during the particular phase of flight.

The illustrations of electric motor system 200 in FIG. 2 and electric motor system 300 in FIG. 3 are provided as examples of some implementations for electric motor system 102 in FIG. 1. These illustrations are not meant to limit the manner in which other electric motor systems may be implemented. For example, other electric motor systems may have other numbers of electric motors. For example, an electric motor system may have one electric motor, 10 electric motors, or some other number of electric motors.

Further, the different electric motors may be of the same type or different types in the illustrative examples. Further, in other illustrative examples, more than one electric motor may be assigned the same switching frequency depending on the particular implementation. Assigning two electric motors the same frequency in some illustrative examples may result in reaching a desired signature for the electric motor system.

Figure 4:
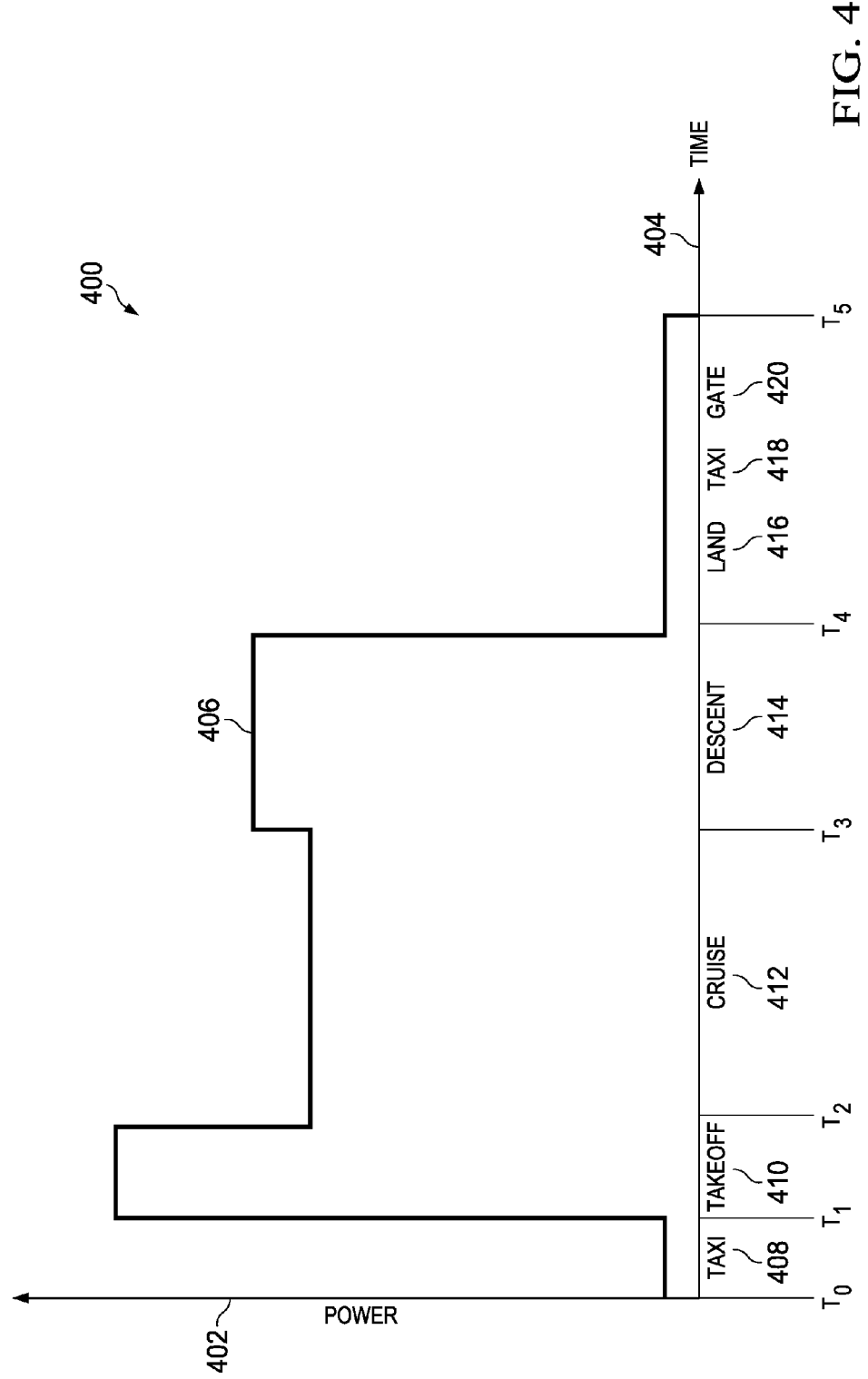
FIG. 4 is an illustration of phases of operation with respect to power requirements for an aircraft in accordance with an illustrative embodiment.

With reference next to FIG. 4, an illustration of phases of operation with respect to power requirements for an aircraft is depicted in accordance with an illustrative embodiment. In this depicted example, graph 400 illustrates power requirements during the flight of an aircraft. Y-axis 402 represents power while x-axis 404 represents phases of flight over time.

As depicted, line 406 in graph 400 represents the power requirements for the aircraft. In this illustrative example, taxi 408 occurs between time $T_0$ to time $T_1$. Take off 410 occurs between time $T_1$ and time $T_2$, cruise 412 occurs between time $T_2$ and time $T_3$, and descent 414 occurs between time $T_3$ and time $T_4$. The phases of operation land 416, taxi 418, and gate 420 occur between time $T_4$ and time $T_5$.

As depicted, the power requirements vary between the different phases of operation. With these phases of operation, the priority of electric motors in an electric motor system, such as those in electric motor system 300 in FIG. 3, may vary. For example, during takeoff 410, master electric motor 304 may have the highest priority with respect to performance as compared to gate 420, when other types of electric motors may have a higher priority. These different priorities may be sent in priority information 336 in FIG. 3 to primary controller 314 and may be sent before, during, or both before and during various phases of flight.

Of course, the phase of operation may vary depending on the type of platform or mission performed on the platform. This illustrative example is directed towards a commercial aircraft. Other types of aircraft may include similar phases of operation to commercial aircraft, but also may include missions or operations within each phase that may change priority information 336.

As an example, the electric motors may be used in a military aircraft, where a stealth operating phase during cruising is desirable. In stealth operating phase, reducing the signature of the electric motor system may be desirable. Accordingly, primary controller 314 may operate electric motors 306, 308, 310, and 312, such that electromagnetic and acoustic signals are minimized. Minimizing the electromagnetic and acoustic signals may be the highest priority of the stealth phase and may be communicated in priority information 336. The stealth phase may include one or more mission phases, a payload release, reconnaissance, rescue, intercept, or other missions specific to the aircraft, where minimizing detectability is desirable.

In other illustrative examples, priority information 336 may indicate that efficiency is more important than reducing electromagnetic or acoustic signatures. For example, an aircraft performing evasive maneuvers, offensive maneuvers, and other suitable operations may prioritize performance over detectability.

With other vehicles, such as submarines, the phases of operation may include diving, cruising, silent operation, surfacing, and other suitable phases. Submarines also may operate in various mission phases including, for example, stealth and payload release, among others. Decreasing detectability of an acoustic signature may be particularly desirable for the submarine during one or more of these phases of operation. Accordingly, priority information 336 may be sent to primary controller 314 to control electric motor system 300 to reduce the acoustic signature of the submarine.

Of course, these examples are just some of the examples of phases of operation and vehicles that may use electric motor system 300. These examples are not intended to limit the scope of an illustrative embodiment.

Figure 5:
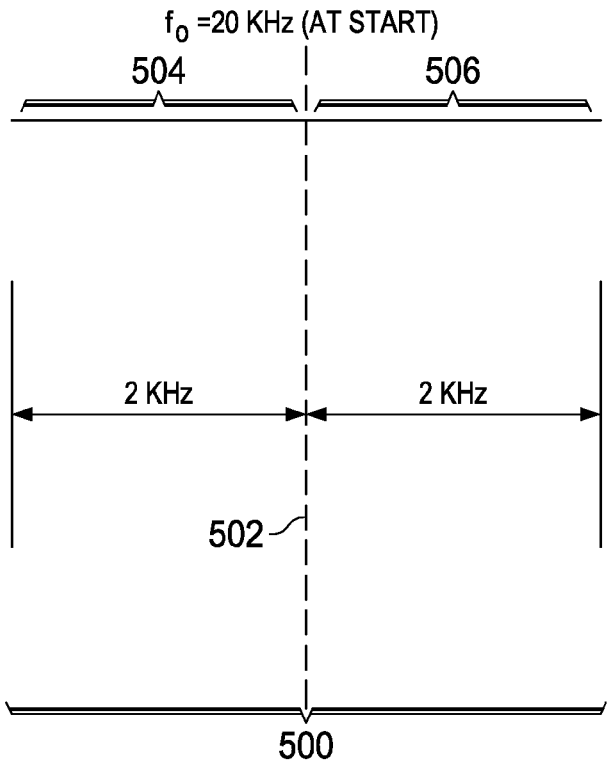
FIG. 5 is an illustration of a range of switching frequencies in accordance with an illustrative embodiment.

With reference next to FIG. 5, an illustration of a range of switching frequencies is depicted in accordance with an illustrative embodiment. In this illustrative example, range 500 is a range of switching frequencies that may be used for a selected switching frequency for an electric motor.

In this illustrative example, frequency 502 is a switching frequency selected for an electric motor. Range 500 has first section 504 and second section 506. In this illustrative example, first section 504 and second section 506 are equal. Each of these two sections may be defined based on a step size for an electric motor. In other words, the step size defines how many switching frequencies are present in each section. In other illustrative examples, first section 504 and second section 506 may be unequal in the number of frequencies present in each section.

In this example, frequency 502 is the starting frequency and has a value of about 20 kHz. For example, 20 kHz may be a requested operating frequency for electric motor 306 in FIG. 3. First section 504 and second section 506 are about 2 kHz in size. In other words, range 500 is about 4 kHz.

The switching frequency of an electric motor, such as electric motor 306, may change within range 500 in this illustrative example. In some illustrative examples, a switching frequency may sweep through the range. For example, the switching frequency may start at 20 kHz and then increase until 22 kHz is reached. The switching frequency may then change to 18 kHz and then increase again until 20 kHz is reached. In other illustrative examples, the frequency may change randomly. In other words, the frequency may change within range 500 on a random basis.

By changing the switching frequency within range 500, the detectability of the operation of an electric motor system may be reduced. For example, changing the switching frequency may avoid harmonics that may be present even though different switching frequencies are used.

Change in the switching frequency may be performed periodically. For example, a switching frequency may be changed within range 500 in a period of time that may be selected from 0.5 seconds, 1.0 seconds, 4 seconds, or some other period of time. Further, the time used also may vary depending on the phase of operation or other events.

Figure 6:
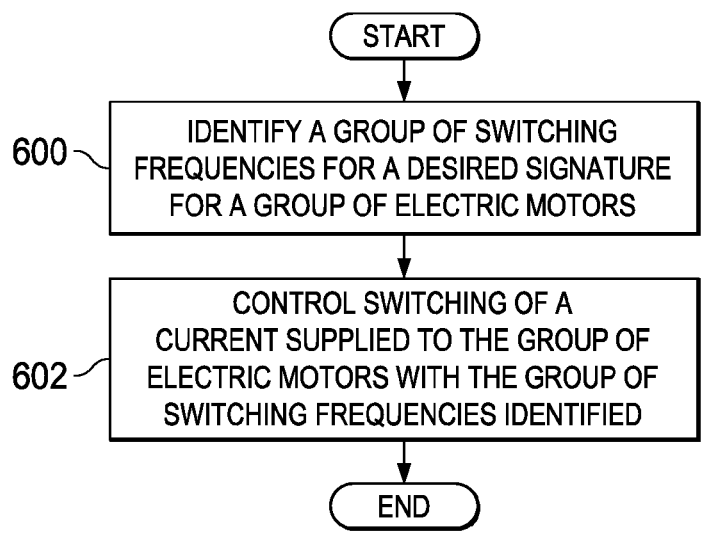
FIG. 6 is an illustration of a flowchart of a process for controlling an electric motor in accordance with an illustrative embodiment.

With reference now to FIG. 6, an illustration of a flowchart of a process for controlling an electric motor is depicted in accordance with an illustrative embodiment. The process illustrated in FIG. 6 may be implemented in controller 108 in FIG. 1. This process may be implemented to control group of electric motors 104 in electric motor system 102 in FIG. 1. This process may be performed for each electric motor in the group of electric motors.

The process begins by identifying a group of switching frequencies for a desired signature for a group of electric motors (operation 600). The process then controls switching of a current supplied to the group of electric motors with the group of switching frequencies identified (operation 602), with the process terminating thereafter.

Turning next to FIG. 7, an illustration of a flowchart of a process for controlling an electric motor is depicted in accordance with an illustrative embodiment. The process illustrated in FIG. 7 is a more detailed example of a process for controlling a group of electric motors such as group of electric motors 104 using controller 108 in FIG. 1.

The process begins by identifying a phase of operation for a group of electric motors (operation 700). A switching frequency list is generated for each of the group of electric motors for a group of desired operating conditions (operation 702). The switching frequency list generated may be similar to those illustrated in FIG. 3. In these illustrative examples, the switching frequency list for each electric motor identifies a switching frequency for a group of desired operating conditions. The group may be, for example, group of desired operating conditions 138 in FIG. 1.

The process then selects a switching frequency for each of the group of electric motors based on the switching frequency list for each of the group of electric motors and a priority for the group of electric motors (operation 704). In operation 704, the particular switching frequency used may not always be the frequency with the highest priority in the switching list. When the same frequencies are present in more than one list, a priority of the electric motors in the group of electric motors may be used to select which electric motor receives a particular switching frequency. The electric motor with a lower switching priority may use the next switching frequency list.

The process then controls switching of a current supplied to the group of electric motors with a group of switching frequencies identified (operation 706). A determination is made as to whether the phase of operation for the group of electric motors has changed (operation 708). If the phase of operation has changed, the process returns to operation 700. Otherwise, the process returns to operation 706.

Turning now to FIG. 8, an illustration of a flowchart of a process for managing switching frequencies for electric motors in accordance with an illustrative embodiment. The process illustrated in FIG. 8 may be implemented in controller 108 to control operation of group of electric motors 104 in electric motor system 102 to FIG. 1.

The process begins by identifying a switching frequency assigned to an electric motor (operation 800). The switching frequency is the current switching frequency.

Next, the process controls the electric motor using the current switching frequency (operation 802). The process waits for a period of time (operation 804).

The process then changes a value of the current switching frequency within a range (operation 806), with the process then returning to operation 802.

In some examples, the length of the period of time the process waits in operation 804 may vary randomly. For example, each time the process returns to operation 804, a different time period may be randomly selected. In this instance, the process may wait the randomly selected time period before proceeding to operation 806. In other illustrative examples, the time period may be the same each time the process returns to operation 804, or may alternate between a number of combinations of preselected time periods, depending on the particular implementation.

In the illustrative example, the value may be changed by sweeping through the range of switching frequencies. In other illustrative examples, the value may be changed randomly or through some other mechanism.

Figure 9:
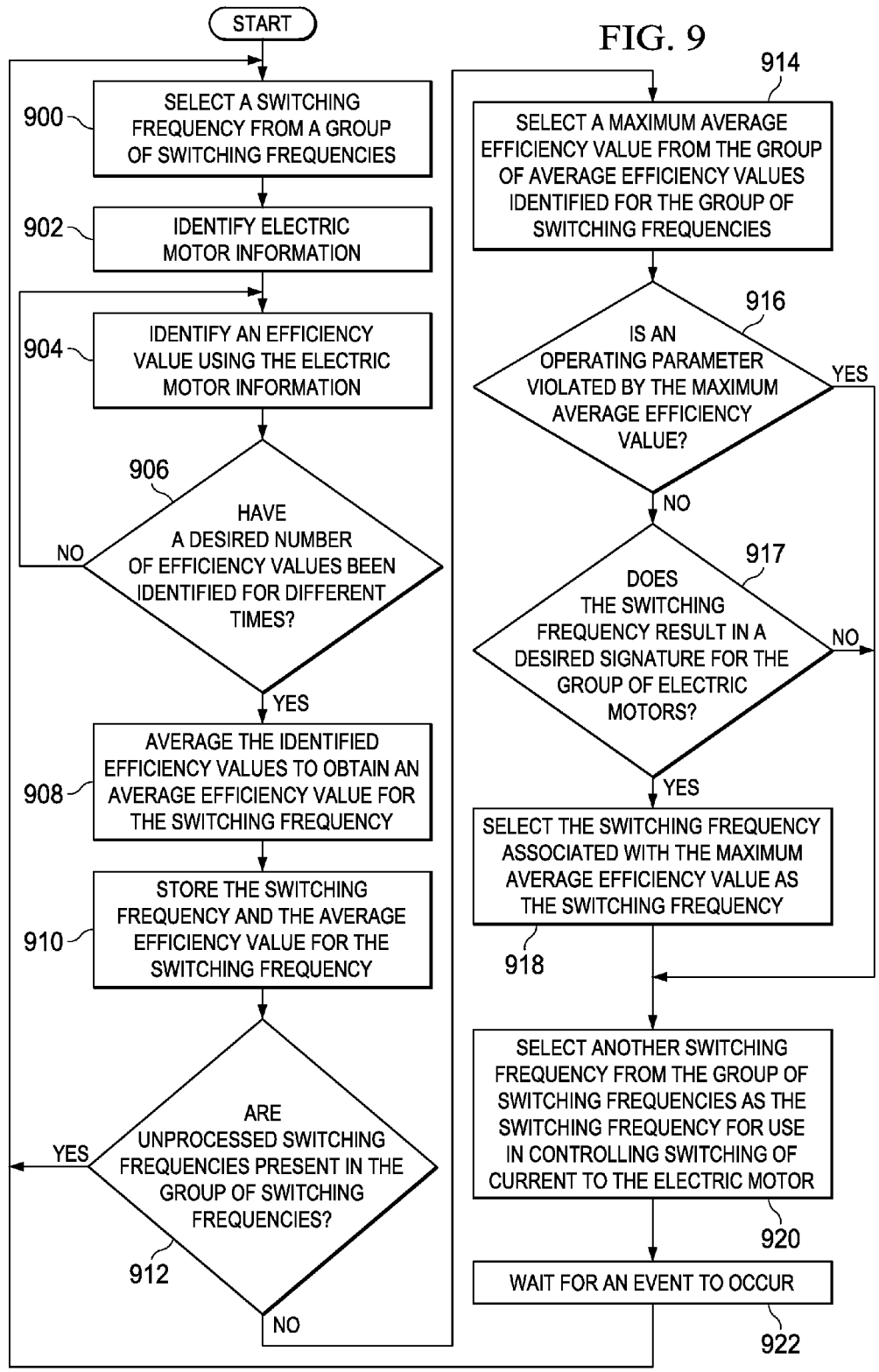
FIG. 9 is an illustration of a flowchart of a process for identifying a switching frequency in accordance with an illustrative embodiment.

Turning next to FIG. 9, an illustration of a flowchart of a process for identifying a switching frequency is depicted in accordance with an illustrative embodiment. The process illustrated in FIG. 9 is an example of one manner in which a switching frequency may be identified based on performance such as group of desired operating conditions 138 in FIG. 1. These switching frequencies may be used to generate switching frequency lists such as those in FIG. 3 and may be used to select a particular switching frequency based on a desired performance as described by the group of desired operating conditions for the electric motor as well as a desired signature for the electric motor.

The process in this illustrative example may be used to identify a desired switching frequency. The process illustrated in this example uses a frequency sweep in which a group of switching frequencies are used to identify the efficiencies of the electric motor for different switching frequencies in the group of switching frequencies selected.

The process begins by selecting a switching frequency from a group of switching frequencies (operation 900). The group of switching frequencies may be a range of frequencies through which the process may sweep in these illustrative examples. For example, the group of frequencies may be from about 20 kHz to about 80 kHz in which the step size is about 10 kHz. This range of frequencies form the group of switching frequencies used in the frequency sweep. In this illustrative example, the switching frequency may begin at the lower end of the range, such as 20 kHz.

The process then identifies electric motor information (operation 902). In these illustrative examples, the electric motor information may be, for example, input voltage, input current, revolutions per minute, and torque for the electric motor.

The process then identifies an efficiency value using the electric motor information (operation 904). In the illustrative example, the efficiency value for the electric motor may be identified as follows:

$$e = \frac{\tau\omega}{V_{in}i_{in}}$$

where e is efficiency, $\tau$ is torque of the electric motor, $\omega$ is revolutions per minute of the electric motor, $V_{in}$ is voltage input to the electric motor, and $i_{in}$ is current input to the electric motor.

The efficiency identified in operation 904 is an instantaneous efficiency. In other words, the efficiency is for a particular point in time.

A determination is made as to whether a desired number of efficiency values have been identified for different times (operation 906). In this illustrative example, the period of time over which the samples are taken and averaged may be, for example, about one second. Of course, other time periods may be used such as about 0.5 seconds, about 3.0 seconds, or some other suitable period of time. If the desired number of efficiency values have not been identified, the process returns to operation 904.

Otherwise, the process then averages the identified efficiency values to obtain an average efficiency value for the switching frequency (operation 908). The switching frequency and the average efficiency value for the switching frequency are stored (operation 910).

A determination is made as to whether unprocessed switching frequencies are present in the group of switching frequencies (operation 912). If another switching frequency is present that has not been processed, the process returns to operation 900.

When all of the switching frequencies in the group of switching frequencies have been processed, a group of average efficiency values is identified for the group of switching frequencies. The process then selects a maximum average efficiency value from the group of average efficiency values identified for the group of switching frequencies (operation 914). At this point in operation 914, a profile for the group of average efficiency values for the group of switching frequencies is present. This profile is for a period of time that is substantially close to the current time during which the electric motor is operating. The maximum average efficiency value is selected from this profile in operation 914.

The selection of the switching frequency from a highest average efficiency value in the group of average efficiency values may be subject to the violation of an operating parameter. A determination is made as to whether an operating parameter is violated by the maximum average efficiency value (operation 916). The operating parameter may be an operating parameter in group of operating parameters 142 in FIG. 1.

In operation 916, the switching frequency associated with the maximum average efficiency value may be used to determine whether an operating parameter such as a maximum motor temperature, a maximum controller temperature, or some other condition specified by the operating parameter is exceeded when using the switching frequency.

For example, higher switching frequencies may cause a controller for the electric motor to heat up more quickly as compared to lower switching frequencies. Further, the higher switching frequencies may allow stators in an electric motor to cool more quickly than lower switching frequencies. The operating parameter may designate a threshold or range of values that may limit how high the switching frequency may be.

If an operating parameter is not violated, a determination is made as to whether the switching frequency results in a desired signature for the group of electric motors (operation 917). This determination is used to determine whether the operating parameter also provides a desired level for the desired signature generated by the group of electric motors.

In other words, the operations may determine whether the electromagnetic signature, the acoustic signature, or both are as low as desired for the group of electric motors. If the switching frequency results in a desired signature, the process selects the switching frequency associated with the maximum average efficiency value as the switching frequency (operation 918). The process then selects another switching frequency from the group of switching frequencies as the switching frequency for use in controlling switching of current to the electric motor (operation 920).

With reference again to operation 916, if an operating parameter is violated, the process proceeds to operation 920 as described above. With reference again to operation 917, if the switching frequency does not result in a desired signature, the process also proceeds to operation 920.

In operation 920, the switching frequency may be a switching frequency for the next highest average efficiency value that does not violate the operating parameter. The switching frequency for this next highest average efficiency value may be used until the violation of the operating parameter is no longer present. This determination may be made on the next sweep of the switching frequencies.

The process then waits for an event to occur (operation 922). The process then returns to operation 900 after the event occurs. In these illustrative examples, the event may take different forms. For example, the event may be a periodic event or non-periodic event.

A periodic event may be a passage of a selected amount of time. The time period may be, for example, two minutes, five minutes, seven minutes, or some other time period. With this passage of time, switching frequencies previously selected may expire or no longer be used. At this point, new switching frequencies may be identified. In this manner, the average efficiencies for the group of switching frequencies may be refreshed to have a current profile that may reflect operating conditions currently encountered by the motor system.

A non-periodic event may be, for example, a change in temperature, a change in the load on the electric motor, an operator-initiated event, a change in operating conditions that is greater than a threshold, or some other suitable type of event. For example, a non-periodic event may be a change in operating conditions that exceeds a threshold or falls outside of the range.

Of course, other techniques may be used to identify a switching frequency. Instead of making measurements, models and simulations also may be used to identify optimal switching frequencies for different operating conditions. Additionally, although a range from about 20 kHz to about 80 kHz is shown in this particular example, other ranges of frequencies may be used to control the switching of current to the electric motor by switches in the controller. The particular frequencies or range of frequencies may depend on the particular components. For example, different frequencies may be more suitable for some types of motors and their applications as opposed to others. Additionally, other factors also may affect the frequencies used. For example, the types of switches or other components in the controller also may be used as a factor in selecting particular frequencies or a range of frequencies.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

With reference now to FIG. 10, an illustration of a table of rules for handling operating parameters is depicted in accordance with an illustrative embodiment. In this illustrative example, table 1000 is a policy in the form of rules for managing a violation of operating parameters. In particular, the switching frequency may be identified from a highest average efficiency value in the group of average efficiency values subject to violation of a rule for an operating parameter.

In this illustrative example, table 1000 includes rule 1002, rule 1004, rule 1006, and rule 1008. In this illustrative example, table 1000 includes operating parameter column 1013, constraint column 1014, and action column 1016 for the rules. In this illustrative example, rule 1002, rule 1004, rule 1006, and rule 1008 may be applied to a range of switching frequencies from about 20 kHz to about 80 kHz.

In rule 1002, the operating parameter is maximum stator temperature. The constraint is violated for rule 1002 in this example when the maximum stator temperature has been exceeded. When the maximum stator temperature has been exceeded, the action is to set the switching frequency to about 40 kHz in this illustrative example.

In table 1000, rule 1004 is for the operating parameters comprising maximum stator temperature increase rate and maximum stator temperature. The constraint on these parameters is violated when the maximum stator temperature increase rate has been exceeded and the maximum stator temperature is at least 90 percent. When rule 1004 is invoked, the action is to set the switching frequency to about 40 kHz.

Next, in rule 1006, the operating parameter is maximum controller temperature. The constraint for this operating parameter is violated when the maximum controller temperature has been exceeded. The switching frequency is set to about 20 kHz as the action taken in this rule.

In the illustrative example, in rule 1008, the operating parameters are maximum controller temperature increase rate and maximum controller temperature. The constraint on these parameters is violated when the maximum controller temperature increase rate has been exceeded and the maximum controller temperature is at least 90 percent. In this example, the action is to set the switching frequency to about 20 kHz.

The illustration of rules in table 1000 in FIG. 10 is not meant to limit the manner in which other rules may be implemented. Further, although specific values have been shown as examples of values for switching frequencies, other values may be used for switching frequencies other than those illustrated in this figure. In different implementations, the values selected for switching frequencies may be selected as ones that provide a desired operating condition when constraints of some operating parameters are violated. In other illustrative examples, rules may be used only with respect to operating conditions for the electric motor. In still other illustrative examples, rules also may include those with respect to other devices that may be affected by heat generated by at least one of the controller or the electric motor. Of course, the rules may take into account any conditions, constraints, parameters, or other factors that may be of interest in managing the operation of the electric motor system.

With reference next to FIG. 11, an illustration of a table of events that may be used to restart the identification of a switching frequency is depicted in accordance with an illustrative embodiment. In this illustrative example, table 1100 identifies examples of events that may result in re-initiating the process in FIG. 9.

In this illustrative example, table 1100 includes entry 1102 and entry 1104. Entry 1102 indicates that a sweep of frequencies to identify a switching frequency is to be performed when the event is a constraint for the revolutions per minute to increase or decrease by 10 percent since the last time a switching frequency was identified. Entry 1104 indicates that the frequency should be re-identified by performing a frequency sweep as describe above when the event is the torque increasing or decreasing by at least 10 percent since the last identification of the switching frequency.

Of course, the illustration of the events in entry 1102 and entry 1104 are examples of some events that may be used to restart the process of identifying a switching frequency. Of course, other types of events may be used depending on the particular implementation. For example, an event may be used if the temperature of other devices within a selected distance of the electric motor is a temperature greater than some threshold. As another example, the event may be the expiration of the time period, which results in identifying the switching frequency again through the sweeping process described above.

The illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in the form of a block diagram in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1200 in FIG. 12.

In one illustrative example, an electric motor system may be manufactured during component and subassembly manufacturing 1206. Electric motor system may be integrated into aircraft 1300 during system integration 1208 in FIG. 12.

The electric motor system also may be integrated into aircraft during maintenance and service 1214. For example, electric motor system may be integrated as part of regular maintenance, upgrades, refurbishment, or other operations in aircraft 1300. In some illustrative examples, modifications or changes to a controller in the electric motor system may be performed without installing electric motors to form an electric motor system such as electric motor system 102 in FIG. 1.

Further, one or more apparatus embodiments, method embodiments, or a combination thereof may be utilized while aircraft 1300 is in service 1212, during maintenance and service 1214 in FIG. 12. For example, an electric motor system may be operated as described above to reduce the detectability of aircraft 1300. In other illustrative examples, the electric motor system may be operated to reduce sounds that may be heard by passengers in aircraft 1300.

Figure 14:
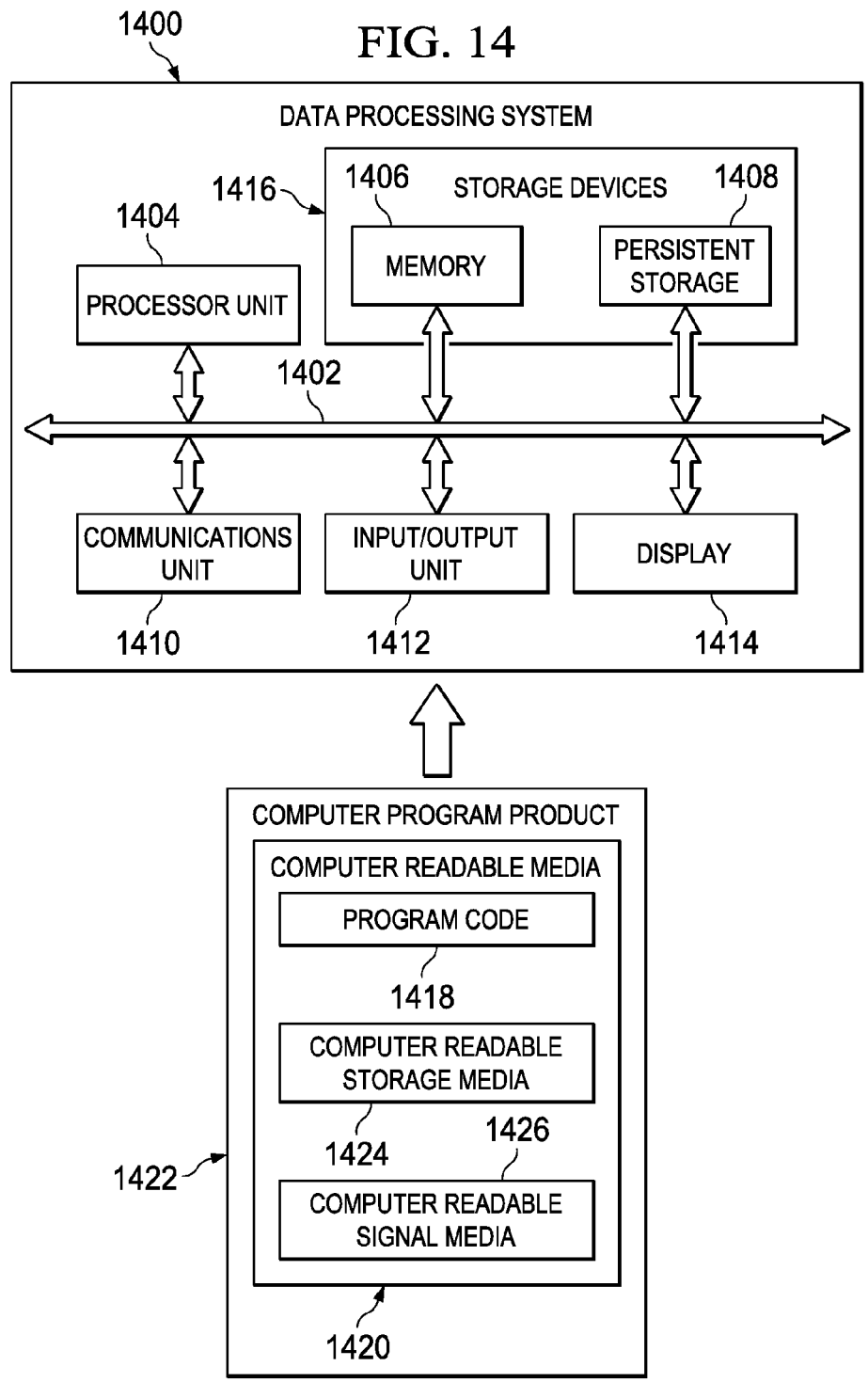
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement controllers, such as controller 108 in FIG. 1 and other suitable devices.

In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Thus, one or more illustrative embodiments provide a method and apparatus for controlling a group of electric motors. In the illustrative examples, a signature for an electric motor system containing a group of electric motors may be reduced. For example, the detectability of the group of electric motors for a platform in which the group of electric motors is located may be reduced through reducing electromagnetic signature of the group of electric motors.

In another illustrative example, the detectability of the group of electric motors to passengers in a platform such as an aircraft may be reduced. As a result, increased passenger comfort may be obtained in an aircraft implementing an electric motor system in accordance with an illustrative embodiment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a controller configured to
      identify a group of switching frequencies for a desired signature for a group of electric motors;
      control switching of a current supplied to the group of electric motors with the group of switching frequencies for the desired signature identified;
      determine a group of average efficiency values for an electric motor in the group of electric motors based on the group of switching frequencies; and
      identify a selected switching frequency from the group of switching frequencies using an average efficiency value in the group of average efficiency values that complies with an operating parameter and the desired signature;
   wherein the desired signature comprises at least one of electromagnetic signals and acoustic signals generated by operation of the group of electric motors;
   wherein the controller is distributed among the group of electric motors and comprises a primary controller and a plurality of secondary controllers;
   wherein a first secondary controller in the plurality of secondary controllers is configured to send a request to the primary controller to use a requested switching frequency, a second secondary controller in the plurality of secondary controllers is configured to send a request to the primary controller to use the requested switching frequency, and in response to the requests, the primary controller assigns the selected switching frequency from the group of switching frequencies for the desired signature to the first secondary controller based on a priority scheme; and
   wherein the primary controller selects the selected switching frequency depending on whether detectability of an acoustic signature is prioritized during a particular phase of flight.

2. The apparatus of claim 1, wherein the controller comprises:
   a frequency identifier configured to receive sensor data about a signature for the group of electric motors and identify the group of switching frequencies meeting the desired signature from the sensor data received; and a frequency controller configured to control the switching of the current supplied to the group of electric motors with the group of switching frequencies identified.

3. The apparatus of claim 2 further comprising:
a sensor system configured to generate the sensor data.

4. The apparatus of claim 1, wherein the controller is configured to select the group of switching frequencies based on a priority between a group of desired operating conditions for the group of electric motors and the desired signature for the group of electric motors.

5. The apparatus of claim 1, wherein the controller is configured to change the group of switching frequencies during operation of the group of electric motors.

6. The apparatus of claim 1, wherein the group of switching frequencies changes in response to changes in at least one of a group of operating parameters for the group of electric motors or a phase of operation of a platform in which the group of electric motors is located.

7. The apparatus of claim 1, wherein the group of switching frequencies changes in response to changes in a phase of operation of a platform in which the group of electric motors is located, the platform is an aircraft, and the phase of operation is selected from one of taxiing, take off, ascent, cruising, descent, and landing.

8. The apparatus of claim 1, wherein the desired signature comprises at least one of electromagnetic signals or acoustic signals.

9. The apparatus of claim 1, wherein the controller is configured to identify the group of switching frequencies based on the desired signature and a group of desired operating conditions.

10. The apparatus of claim 9, wherein the group of desired operating conditions is selected from at least one of efficiency or power.

11. The apparatus of claim 1,
wherein the desired signature comprises electromagnetic signals and acoustic signals generated by operation of group of electric motors;
wherein the primary controller is associated with a master electric motor of the group of electric motors, the first secondary controller is associated with a first electric motor of the electric motors, and the second secondary controller is associated with a second electric motor of the electric motors;
wherein the primary controller the secondary controllers each generate a list of switching frequencies;
wherein the primary controller generates a first switching frequency list, the first secondary controller generates a second switching frequency list, and the second secondary controller generates a third switching frequency list;
wherein the switching frequencies of the switching frequency lists are ordered in a preference for performance for the electric motors for which the switching frequency lists are generated;
wherein each of the secondary controllers sends a request for a desired switching frequency for one of the electric motors to the primary controller;
wherein the primary controller is configured to determine whether to use a requested switching frequency with a particular electric motor;
wherein the primary controller controls which switching frequencies are used by different electric motors in the group of electric motors;
wherein when the first secondary controller requests a first switching frequency and the second secondary controller also requests the first switching frequency, and having two electric motors using a same switching frequency is undesirable, the primary controller
decides which electric motor uses the first switching frequency using a priority scheme in which the master electric motor has a highest priority and the first electric motor has a higher priority than the second electric motor,
sends a reply to the first secondary controller that allows the first electric motor to use the first switching frequency,
receives a request from the second secondary controller to use a second switching frequency, and
returns a reply to the second secondary controller to use the second switching frequency;
wherein a mission computer sends priority information to the primary controller in which the priority identifies a phase of operation of an aircraft and provides assignments of priorities for the electric motors;
wherein the phase of operation is selected from one of taxiing, take off, ascent, cruising, descent, and landing and as a result of receiving the priority information, the primary controller reconfigures one or more of the electric motors and switching frequencies of the electric motors;
wherein when the first switching frequency and the second switching frequency are not integer multiples of one another;
and
wherein the first electric motor and the second electric motor are assigned the same switching frequency when doing so results in reaching the desired signature for the group of electric motors.

12. The apparatus of claim 1, wherein the operating parameter is a temperature of one or more of the controller or the motor.

13. The apparatus of claim 1, wherein the group of switching frequencies changes in response to changes in a phase of operation of a platform in which the group of electric motors is located, the platform is an aircraft, and the phase of operation is selected from one of taxiing, take off, ascent, cruising, descent, and landing.

14. An electric motor system comprising:
a group of electric motors; and
a controller configured to:
identify a group of switching frequencies for a desired signature for the group of electric motors;
control switching of a current supplied to the group of electric motors with the group of switching frequencies identified;
determine a group of average efficiency values for an electric motor in the group of electric motors based on the group of switching frequencies; and
identify a selected switching frequency from the group of switching frequencies using an average efficiency value in the group of average efficiency values that complies with an operating parameter and the desired signature;
wherein the desired signature comprises at least one of electromagnetic signals and acoustic signals generated by operation of group of electric motors;
wherein the controller is distributed among the group of electric motors and comprises a primary controller and a plurality of secondary controllers;
wherein a first secondary controller in the plurality of secondary controllers is configured to send a request to the primary controller to use a requested switching frequency, a second secondary controller in the plurality of secondary controllers is configured to send a request to the primary controller to use the requested switching frequency, and in response to the requests, the primary controller assigns the selected switching frequency from the group of switching frequencies for the desired signature to the first secondary controller based on a priority scheme; and wherein the primary controller selects the selected frequency depending on whether detectability of an acoustic signature is prioritized during a particular phase of flight.

15. The electric motor system of claim 14, wherein the controller comprises:

a frequency identifier configured to receive sensor data about a signature for the group of electric motors and identify the group of switching frequencies meeting the desired signature from the sensor data received; and a frequency controller configured to control the switching of the current supplied to the group of electric motors with the group of switching frequencies identified.

16. The electric motor system of claim 15 further comprising:

a sensor system configured to generate the sensor data.

17. The electric motor system of claim 14, wherein the controller is configured to select the group of switching frequencies based on a priority between a group of desired operating conditions for the group of electric motors and the desired signature for the group of electric motors.

18. The electric motor system of claim 14, wherein the controller is configured to change the group of switching frequencies during operation of the group of electric motors.

19. The electric motor system of claim 14, wherein the group of switching frequencies changes in response to changes in at least one of a desired level of performance for the group of electric motors or a phase of operation of a platform in which the group of electric motors is located.

20. A method for controlling a group of electric motors, the method comprising:

identifying a group of switching frequencies for a desired signature for the group of electric motors;

controlling switching of a current supplied to the group of electric motors with the group of switching frequencies identified;

determining a group of average efficiency values for an electric motor in the group of electric motors based on the group of switching frequencies; and identifying a selected switching frequency from the group of switching frequencies using an average efficiency value in the group of average efficiency values that complies with an operating parameter and the desired signature;

wherein the desired signature comprises at least one of electromagnetic signals and acoustic signals generated by operation of group of electric motors;

wherein the controller is distributed among the group of electric motors and comprises a primary controller and a plurality of secondary controllers; and wherein a first secondary controller in the plurality of secondary controllers is configured to send a request to the primary controller to use a requested switching frequency, a second secondary controller in the plurality of secondary controllers is configured to send a request to the primary controller to use the requested switching frequency, and in response to the request, the primary controller assigns the selected switching frequency from the group of switching frequencies for the desired signature to the first secondary controller based on a priority scheme; and wherein the primary controller selects the selected switching frequency depending on whether detectability of an acoustic signature is prioritized during a particular phase of flight.

21. The method of claim 20, wherein the identifying step and the controlling step are performed during operation of the group of electric motors.

22. The method of claim 20, wherein the identifying step comprises:

identifying the group of switching frequencies for the desired signature for the group of electric motors based on a priority between a group of desired operating conditions for the group of electric motors and the desired signature for the group of electric motors.

23. The method of claim 20, wherein the group of switching frequencies changes in response to changes in at least one of a desired level of performance for the group of electric motors or a phase of operation of an aircraft in which the group of electric motors is located and wherein the phase of operation is selected from one of taxiing, take off, ascent, cruising, descent, and landing.

* * * * *